United States Patent [19]

Tanioka

[11] Patent Number: 5,648,876
[45] Date of Patent: Jul. 15, 1997

[54] LENS BARREL WITH REDUCED PARTS FOR FIXING INTERLOCKING KEY TO ROTARY MEMBER

[75] Inventor: Hiroshi Tanioka, Kashiwa, Japan

[73] Assignee: Nikon Corporation, Tokyo, Japan

[21] Appl. No.: 569,686

[22] Filed: Dec. 8, 1995

[30] Foreign Application Priority Data

Apr. 26, 1995 [JP] Japan .................................. 7-101845

[51] Int. Cl.$^6$ ...................................................... G02B 15/14
[52] U.S. Cl. ............................................ 359/701; 359/708
[58] Field of Search ........................................... 359/701, 694, 359/823, 704, 702

[56] References Cited

U.S. PATENT DOCUMENTS

| | | | |
|---|---|---|---|
| 4,681,406 | 7/1987 | Naito | 359/694 |
| 4,925,282 | 5/1990 | Kanno | 359/694 |
| 5,151,729 | 9/1992 | Takayama | 354/195.12 |
| 5,477,387 | 12/1995 | Takayama | 39/702 |
| 5,576,894 | 11/1996 | Kuwana | 359/701 |

*Primary Examiner*—Georgia Y. Epps
*Assistant Examiner*—Ricky Mack

[57] ABSTRACT

A lens barrel includes an interlocking key member, extending in an optical-axis direction, for transferring a rotary force for moving an optical system and a rotary member serving to hold the interlocking key member and rotating about the optical axis. The rotary member has an inserted portion into which the interlocking key member is inserted and an engagement portion for regulating a movement of the interlocking key member in the optical-axis direction. The interlocking key member has an engaged portion capable of engaging with the engagement portion when inserted into the inserted portion of the rotary member.

4 Claims, 2 Drawing Sheets

LENS BARREL WITH REDUCED PARTS FOR FIXING INTERLOCKING KEY TO ROTARY MEMBER

BACKGROUND OF THE INVENTION

1. Field of the Invention

The present invention relates to a lens barrel equipped with an interlocking key member for, when performing a focusing or zooming operation, transferring a torque needed for this operation.

2. Related Background Art

FIG. 1 is a view illustrating one example of a conventional lens barrel.

A fixed drum 1 includes a mount member 1a provided at the rear end thereof but joined to an unillustrated camera body, an internal cylindrical portion 1b and rectilinear grooves 1c, 1d each formed in the internal cylindrical portion 1b and extending in an optical-axis direction L. This fixed drum 1 inhibits each of a cam ring 2, a zoom operation ring 3 and a segment gear ring 4 from moving in the optical-axis direction L but supports these rings to permit their rotation about the optical axis L.

The cam ring 2 is fixedly connected to a protrusion 3a extending toward an inside diameter of the zoom operation ring 3 but rotates integrally with the zoom operation ring 3.

The segment gear 4 has a segment gear portion 4b formed in an internal peripheral portion at its rear end, which gear portion 4b meshes with a last gear 14 of a gear train linked to an unillustrated driving force source provided in the camera body or in the lens barrel.

Slide drums 5 and 6 are so inserted as to be slidable on an inner peripheral surface of the internal cylindrical portion 1b of the fixed drum 1 and individually have pins 7, 8 formed on their outer peripheral portions. These pins 7, 8 are inserted into cam grooves 2a, 2b formed in the cam ring 2 as well as into the rectilinear grooves 1c, 1d so formed in the internal cylindrical portion 1b of the fixed lens barrel 1 as to extend in the optical-axis direction L.

The slide drum 5 includes a male helicoid thread 5a formed on the front edge thereof. This slide drum 5 inhibits an annular ring 9 from moving in the optical-axis direction L but supports it to permit rotations about the optical axis L.

The slide drum 6 holds a rear lens unit optical system G2.

An interlocking key 10 is fixed to the annular ring 9 with a screw 11 from the optical-axis direction L. This interlocking key 10 is inserted in a key way 4a so formed in the segment gear ring 4 as to extend in the optical-axis direction L. Dimensions of the interlocking key 10 and the key way 4a are set so that the interlocking key 10 does not disengage from the key way 4a with a movement of the slide drum 5 in the optical-axis direction during a zooming operation which will be mentioned later.

A manual focus operation ring 12 is fixed to the annular ring 9 with a screw 13 from a direction orthogonal to the optical axis L.

A lens holding ring 15 serves to hold a front lens unit optical system G1 and is formed with a female helicoid thread 15a formed in the internal surface of the outer cylindrical portion. The female helicoid thread 15a meshes with the male helicoid thread 5a of the slide drum 5. A key protrusion 15b formed on an outer peripheral portion of this lens holding ring 15 engages with a key way 12a so formed in an internal peripheral portion of the manual focus operation ring 12 as to extend in the optical-axis direction L.

Next, an operation of this lens barrel will be explained.

To start with, when the zoom operation ring 3 is rotated when performing the zooming operation, the cam ring 2 rotates together with this ring 3. At this time, the slide drum 5 (as well as the lens holding ring 15 and the optical system G1) and the slide drum 6 (and the optical system G2) move straight back and forth by a predetermined quantity along the optical axis L by the action of the cam grooves 2a, 2b of the cam ring 2, the action of the rectilinear grooves 1c, 1d of the fixed drum 1 and the action of the pins 7, 8 inserted in these grooves.

In case of the auto-focusing, the driving torque of the unillustrated driving force source (motor, etc.) is transferred to the annular ring 9 and the manual focus operation ring 12 from the unillustrated gear train with the gear 14 disposed last via the segment gear portion 4b, the key way 4a and the interlocking key 10.

When the manual focus operation ring 12 is rotated, the lens holding drum 15 (optical system G1) moves back and forth while rotating with the engagements of the key protrusion 15b with the key way 12a and of the male helicoid thread 5a with the female helicoid thread 15a.

In case of the manual focusing, the manual focus operation ring 12 is manually rotated, in the same way as above-mentioned, and the lens holding drum 15 (optical system G1) moves back and forth.

According to the prior art described above, the annular ring 9 can not secure its thickness enough to fix the interlocking key 10 thereto by use of the screw 11 with a strength durable against the above-mentioned transfer of the driving force because of its installation allowable space. The annular ring 9 can not be therefore composed of plastic and is, in many cases, formed as nothing but a metallic member.

On the other hand, the manual focus operation ring 12 is fixed to the annular ring 9 with the screw 13 but is formed of plastic due to constraints in terms of problems of product weight and machining cost.

That is, in the majority of cases, the annular ring 9 and the manual focus operation ring 12 are hindered from being integral with each other for the reason of acquiring a reliability of its strength as well as of the fixed structure of the interlocking key 10.

Further, the screw 11 serves to fix the interlocking key 10 but is a factor of increasing the cost for the operation of fixing the interlocking key 10 to the annular ring 9 by use of screws 11 in addition to the circumstances explained above as well as being, as a matter of course, a high part unit price.

SUMMARY OF THE INVENTION

It is a primary object of the present invention to provide a lens barrel capable of eliminating the necessity for parts for fixing an interlocking key member without decreasing a strength of fixing the interlocking key member and reducing both the number of working processes and costs thereof by forming the related parts into one united body.

For obviating the problem given above, according to one aspect of the present invention, a lens barrel comprises an interlocking key member, extending in an optical-axis direction, for transferring a rotary force for moving an optical system and a rotary member serving to hold the interlocking key member and rotating about the optical axis. The rotary member has an inserted portion into which the interlocking key member is inserted and an engagement portion for regulating a movement of the interlocking key member in the optical-axis direction. The interlocking key member has an engaged portion capable of engaging with the engagement portion when inserted into the inserted portion of the rotary member.

According to the present invention, when the interlocking key member is inserted into the inserted portion of the rotary member, the engagement portion of the rotary member engages with the engaged portion of the interlocking key member. Hence, this eliminates the necessity for parts for fixing the interlocking key member to the rotary member, and the number of working processes can be decreased.

Further, the interlocking key member is inserted into the rotary member, and the engagement portion engages with the engaged portion. Therefore, the strength of fixing the interlocking key member can be kept.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENT

One embodiment of the present invention will hereinafter be discussed with reference to the drawings.

Figure 2:
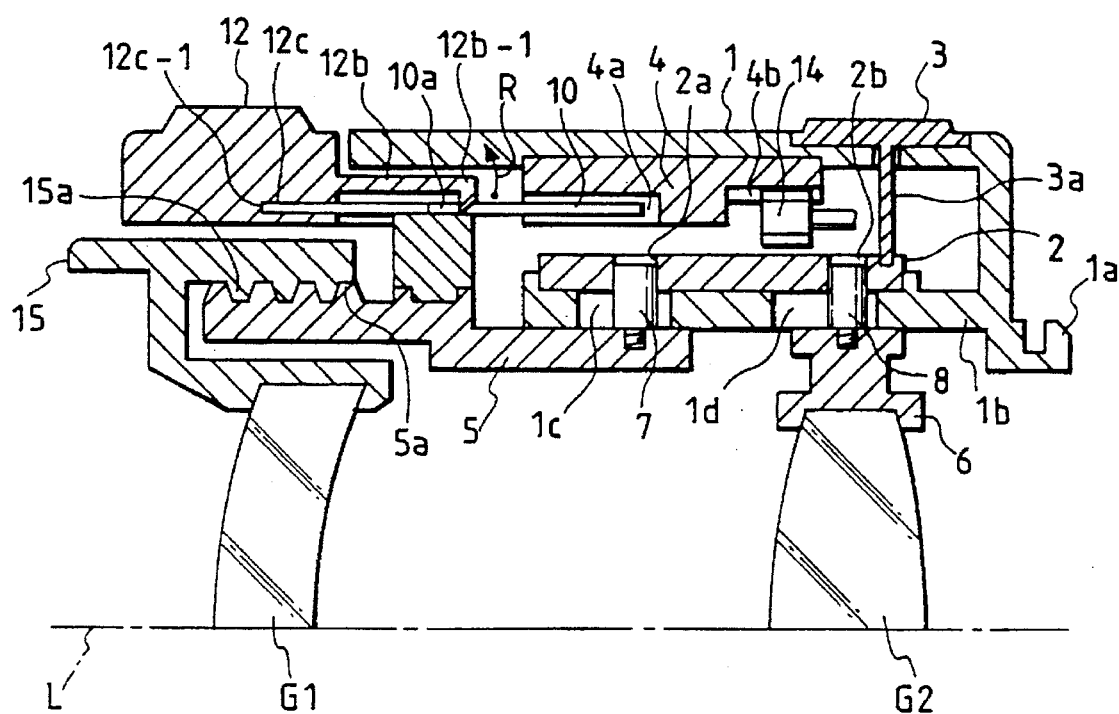
FIG. 2 is a sectional view (a front side portion is shown in section II in FIG. 4) illustrating an embodiment of a lens barrel according to the present invention.
Figure 3:
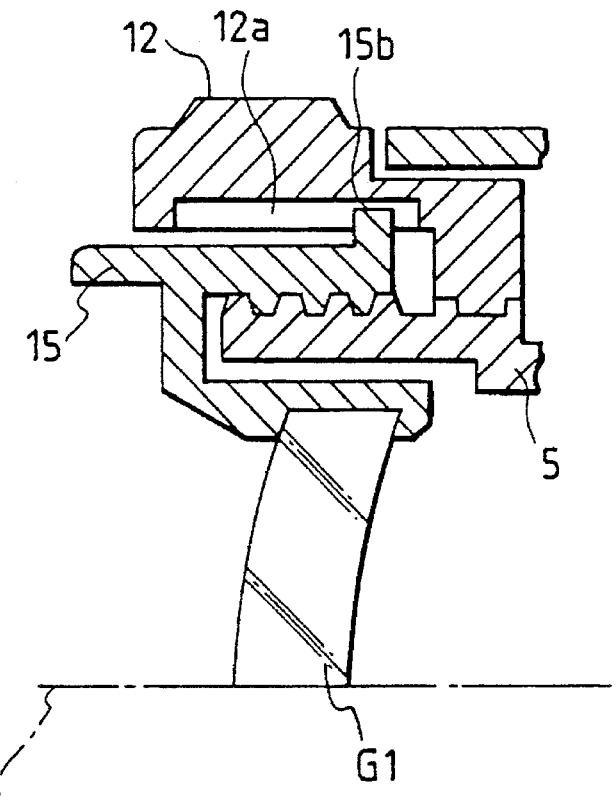
FIG. 3 is a sectional view (section III in FIG. 4) illustrating a front side portion of the lens barrel shown in FIG. 2 in other angular position.
Figure 4:
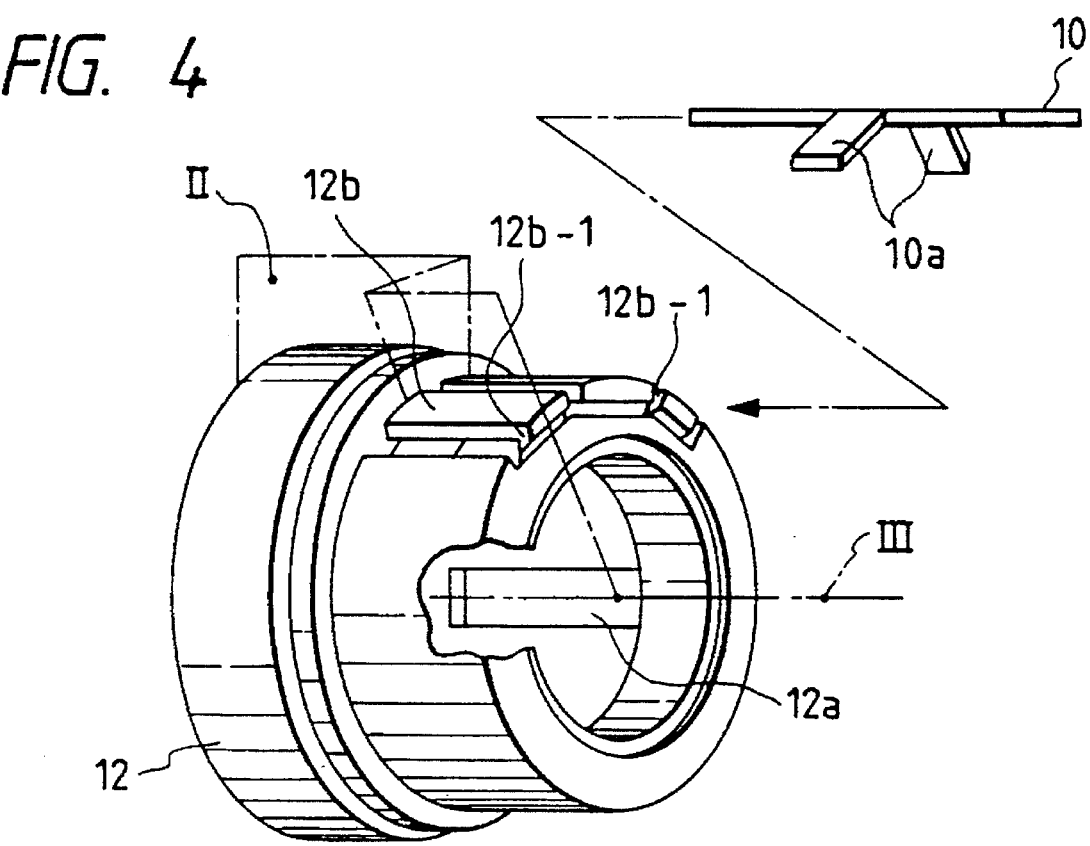
FIG. 4 is a perspective view showing an interlocking key and an interlocking key fixing portion in this embodiment.

FIG. 2 is a sectional view (section II in FIG. 4 with respect to portions in the vicinity of a holding member of an interlocking key 10) illustrating an embodiment of a lens barrel according to the present invention. FIG. 3 is a partial sectional view (section III in FIG. 4) in other angular position. FIG. 4 is a perspective view illustrating the interlocking key 10 and a manual focus operation ring 12.

Figure 1:
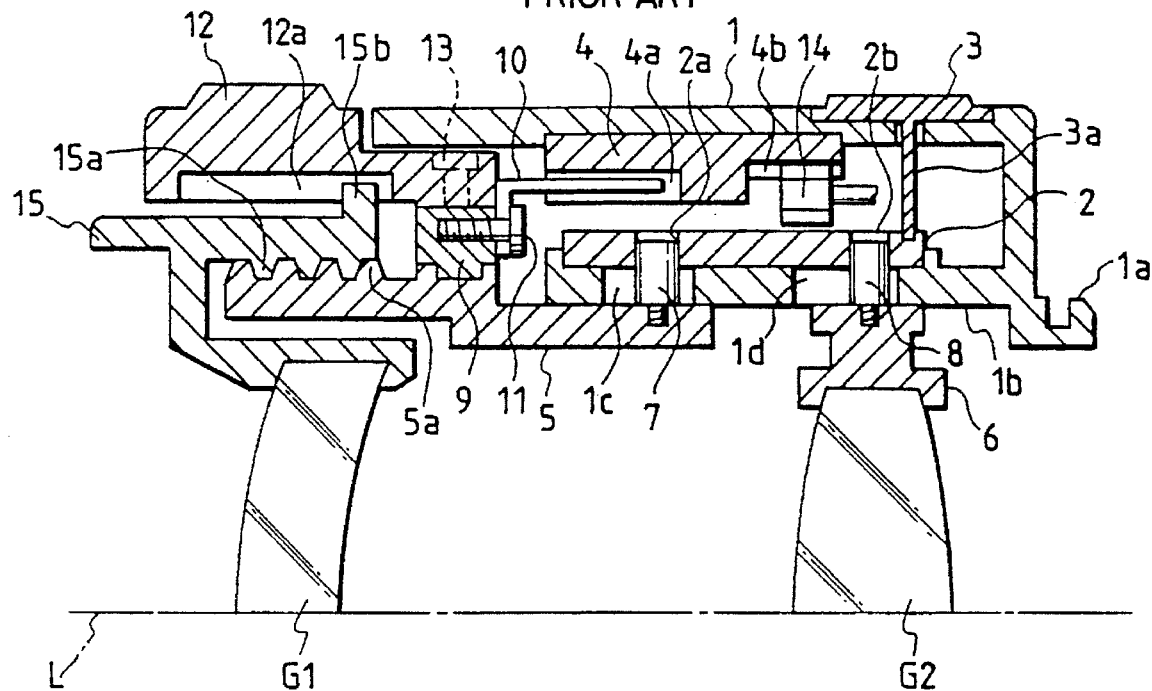
FIG. 1 is a sectional view showing one example of a conventional lens barrel.

Note that respective operations such as zooming, autofocusing and manual focusing, and configurations of individual components for attaining such operations are substantially the same as those in the conventional lens barrel explained in FIG. 1, and, therefore, the explanation thereof will be omitted by marking those components with like numerals.

The manual focus operation ring (rotary member) 12 is formed with a recess 12c having a predetermined depth (in the optical-axis direction L) adjusted to dimensions of a thickness and a width of the interlocking key 10 and also an engagement pawl 12b-1. The manual focus operation ring 12 is also formed with a cantilever beam 12b so as to be elastically deformable in an upward direction (arrowed direction R in FIG. 2).

Further, a key way 12a engaging with a key protrusion 15b is provided in another angular position (surface III in FIGS. 3 and 4).

The interlocking key (interlocking key member) 10 is, as illustrated in FIG. 4, provided with two protrusions 10a, 10a extending in right-and-left oblique directions so as to be capable of engaging with the engagement pawl 12b-1.

Given next is an explanation of the operation of fixing the interlocking key 10 to the manual focus operation ring 12.

The interlocking key 10 is, as illustrated in FIGS. 2 and 4, inserted from the right into a key fixing portion of the manual focus operation ring 12. In the middle of the insertion, a fixing protrusion 10a of the interlocking key 10 impinges on the engagement pawl 12b-1, and, when the interlocking key 10 is further inserted, the engagement pawl 12b-1 is pushed upward (in the arrowed direction R).

At this time, the cantilever beam 12b is elastically deformed. Then, the tip of the interlocking key 10 impinges on an innermost surface 12c-1 of the recess 12c, and, just when the tip thereof stops in a predetermined position in the optical-axis direction L, the cantilever beam 12b is restored back to the previous position, with the result that the engagement pawl 12b-1 engages the protrusion 10a.

The interlocking key 10 is thereby integrally fixed to the manual focus operation ring 12, whereby the driving torque in the case of auto-focusing can be transferred as discussed above.

This embodiment yields the following advantages without reducing the strength of fixing the interlocking key 10.

(1) There is eliminated the necessity for the key fixing screws 11 which have hitherto been required.

(2) When assembled, one-touch fixation can be attained, the number of processes can be reduced as compared with the screw fixation.

(3) The manual focus operation ring has been often separated into two components (marked with the numerals 12, 9 in the conventional example) for the reason given above according to the prior art. The manual focus operation ring can be, however, manufactured based on integral plastic molding.

Accordingly, the costs for the lens barrel can be reduced.

The present invention is not limited to the embodiment discussed above but may be modified and changed in a variety of forms, and these modifications and changes are included within the scope of the present invention.

For example, if there is a space, for the purpose of efficiently transferring the torque, the key fixing portions, the key protrusions 15b and the key ways 12a with respect to the interlocking key 10 and the manual focus operation ring 12 may be provided by a plurality of members.

Further, in regard to the engagement portion, for instance, the cantilever beam 12b may be formed in one position. The interlocking key 10 may be formed with not the protrusion 10a but a hole or a groove as an engaged portion enough to insert the engagement pawl 12b-1 therein.

As discussed above, according to the present invention, when inserting the interlocking key member into the insertion area of the rotary member, the engagement portion of the rotary member engages the engaged portion of the interlocking key member. Hence, this eliminates the necessity for the parts for fixing the interlocking key to the rotary member, resulting in a reduction in the number of working processes.

Moreover, the interlocking key member is inserted into the rotary member, and the engagement portion engages with the engaged portion. Therefore, the strength of fixing the interlocking key member can be kept.

It is apparent that, in this invention, a wide range of different working modes can be formed based on the invention without deviating from the spirit and scope of the invention. This invention is not restricted by its specific working modes except being limited by the appended claims.

What is claimed is:

1. A lens barrel comprising:

an interlocking key member, extending in an optical-axis direction, for transferring a rotary force for moving an optical system; and a rotary member serving to hold said interlocking key member and rotating about the optical axis;

said rotary member having an inserted portion into which said interlocking key member is inserted and an engagement portion for regulating a movement of said interlocking key member in the optical-axis direction, and said interlocking key member having an engaged portion to engage said engagement portion when inserted into said inserted portion of said rotary member.

2. The lens barrel according to claim 1, wherein:

said interlocking key member engages a second rotary member at one end thereof, with the result that the rotary force is transferred between said rotary member and said second rotary member, and said rotary member is rotatable about the optical axis on a slide drum for moving said optical system.

3. The lens barrel according to claim 1, wherein:

said interlocking key member has a bar-like portion, said engaged portion extends crosswise from said bar-like portion, and said engagement portion of said rotary member has a cantilever beam extending in the optical-axis direction and an engagement pawl formed at a distal end of said cantilever beam.

4. The lens barrel according to claim 2, wherein said rotary member comes in direct contact with said slide drum.

* * * * *